United States Patent [19]
Rockower et al.

[11] Patent Number: 4,869,281
[45] Date of Patent: Sep. 26, 1989

[54] SERVICE LINE ACCESS SYSTEM

[75] Inventors: Gerald Rockower; Ronald P. Brigando, both of Brooklyn, N.Y.

[73] Assignee: Brooklyn Union Gas Company, Brooklyn, N.Y.

[21] Appl. No.: 125,575

[22] Filed: Nov. 25, 1987

[51] Int. Cl.⁴ .............................................. F16L 55/18
[52] U.S. Cl. ...................... 137/115; 137/315
[58] Field of Search ................... 137/15, 315

[56] References Cited
U.S. PATENT DOCUMENTS

| | | | |
|---|---|---|---|
| 3,032,867 | 5/1962 | Kerr | 39/213 |
| 3,122,158 | 2/1964 | Grunsky | 137/271 |
| 3,148,690 | 9/1964 | Petersen | 137/15 |
| 3,211,573 | 10/1965 | Hight et al. | |
| 3,211,574 | 10/1965 | Shannon | 117/97 |
| 3,294,121 | 12/1966 | Powell | 138/97 |
| 3,296,861 | 1/1967 | Mueller | 73/201 |
| 3,419,647 | 12/1968 | Hight | 264/35 |
| 3,438,397 | 4/1969 | Gilpin | 137/599 |
| 4,127,141 | 11/1978 | Ledonne et al. | |
| 4,295,494 | 10/1981 | McGowan et al. | |
| 4,350,183 | 9/1982 | Holmes | 138/89 |
| 4,394,202 | 7/1983 | Thomas | 156/94 |
| 4,410,391 | 10/1983 | Thomas | 156/574 |
| 4,487,432 | 12/1984 | Passerell | 285/15 |

Primary Examiner—Bruce Y. Arnold
Assistant Examiner—J. P. Ryan
Attorney, Agent, or Firm—Fitzpatrick, Cella, Harper & Scinto

[57] ABSTRACT

Process and apparatus for plugging or plugging and servering gas service lines may be deployed from a building without requiring access to either the utility service main or main tee connections. The processes are intended to be undertaken while gas is being supplied to the service. The apparatus also allows service lines to be relined under these conditions without requiring direct access to either the utility service main or main tee connections.

30 Claims, 12 Drawing Sheets

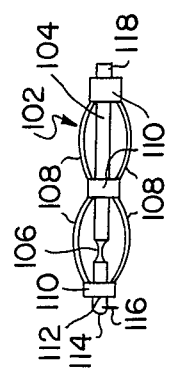
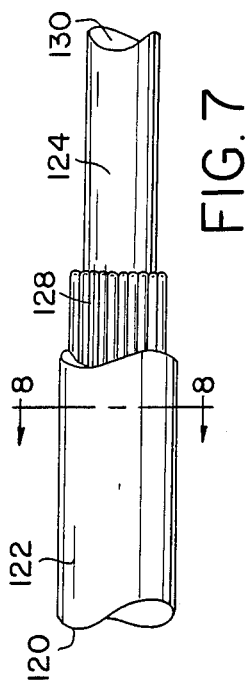
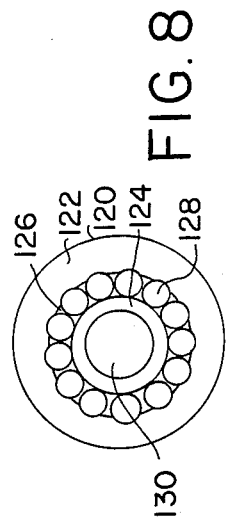
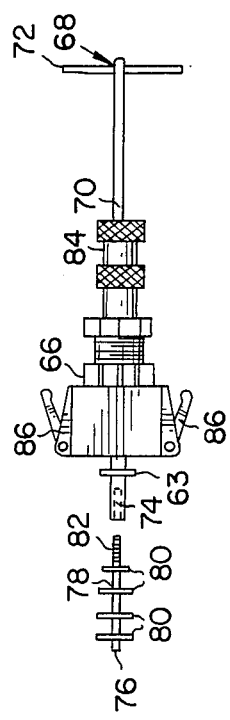
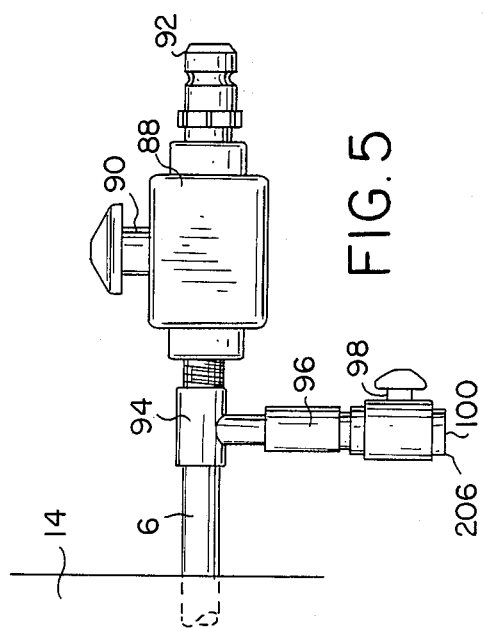

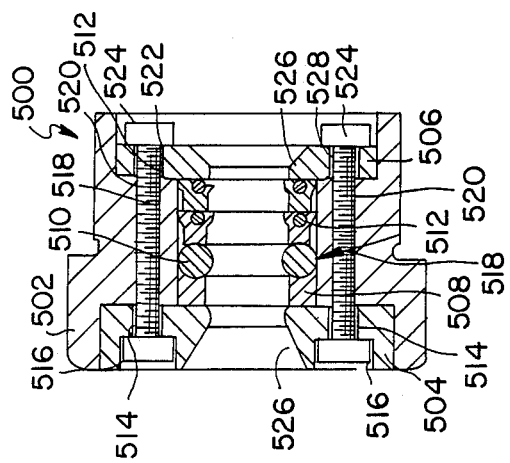
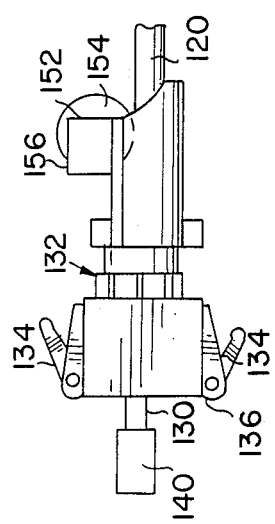
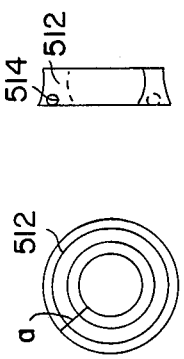

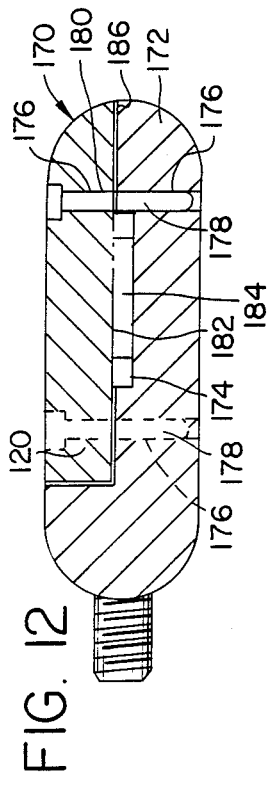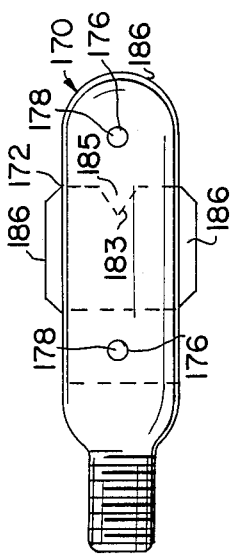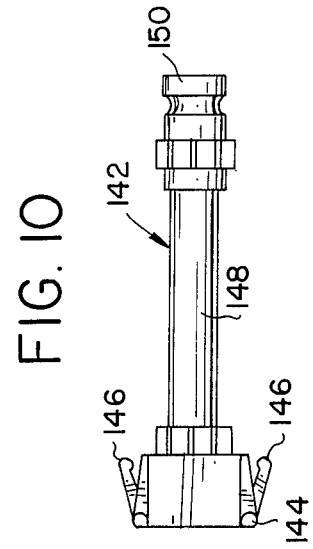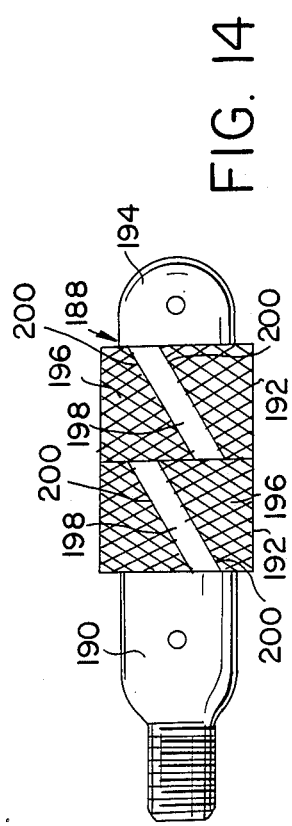

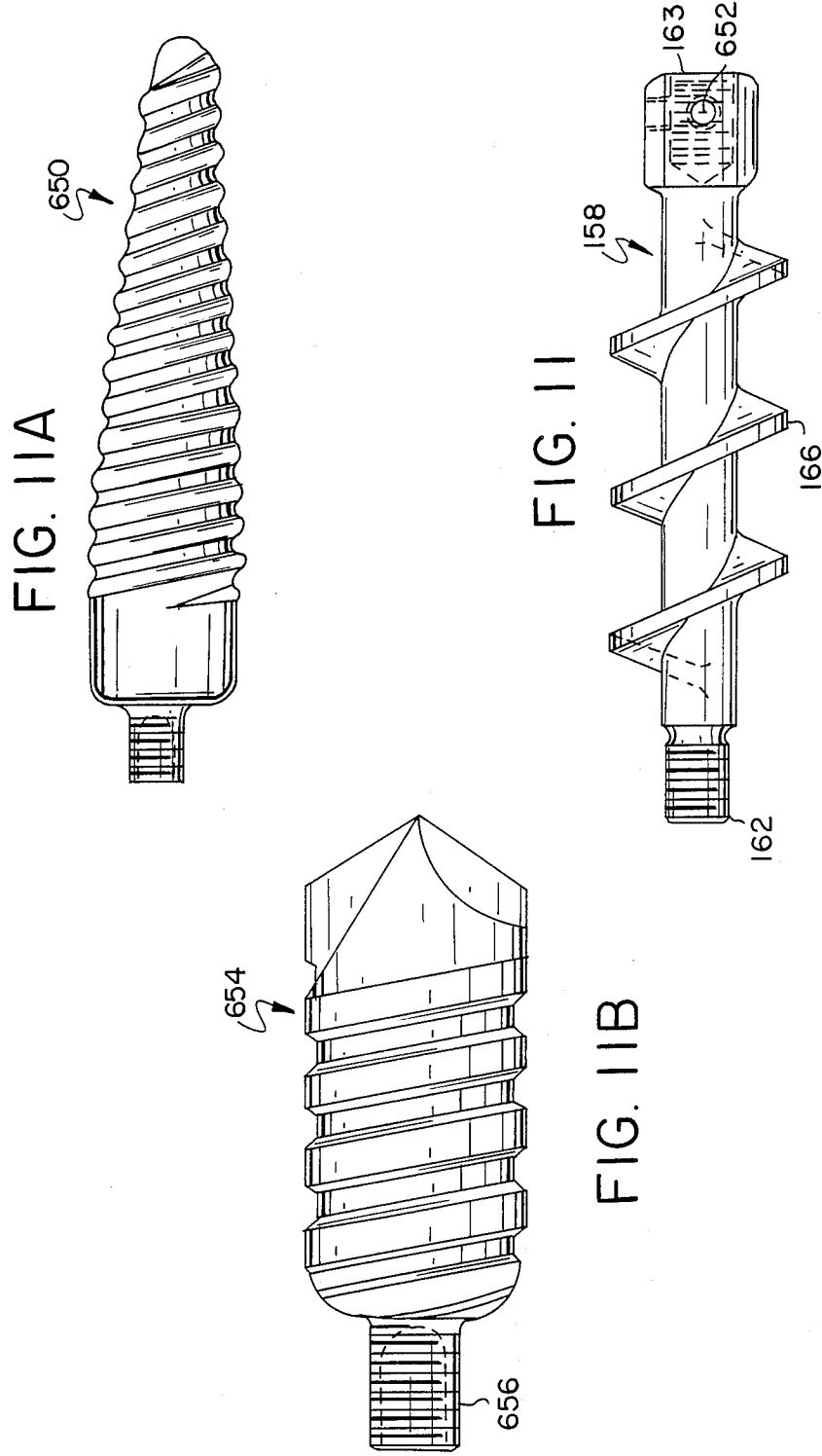

SERVICE LINE ACCESS SYSTEM

BACKGROUND OF THE INVENTION

1. Field of the Invention

The present invention generally relates to gas service connections and methods of repairing the same. More particularly, the present invention relates to improved methods and equipment for inspecting, relining, disconnecting and/or reconnecting gas service lines and gas service connections.

2. Brief Description of the Background Art

It is commonly desirable to physically access gas service lines for a wide variety of reasons. One such reason results from the previous construction of service lines from iron or ferrous alloy pipe. The choice of pipe may previously have been for reasons of economy or requirements of strength, local statutes or zoning requirements. This is still true, even though some localities now permit service lines to be constructed from, for example, plastic piping and the like. However, older and therefore more common iron pipes have, in most areas, been used in service for extended lengths of time and so, are now found to be in accelerated states of decay. In most instances, stress faults and corrosion are found in these pipes to be in at least nascent states, if not actually advanced throughout the gas service. The service then requires some form of repair or replacement so as to effectively preclude the corrosive perforation of any part of the line, in order to best ensure the continued safety and welfare of the public.

In addition, in order to plug or seal the gas service lines, access is required, for example, in order to discontinue service to delinquent customers or to those who may have temporarily or permanently converted to alternate forms of utility service. Access to service lines is also required in order to physically sever the service from the main in the event, for example, that the building or structure to which the service supplies gas is to be vacated, demolished or, of course, moved.

In order to safely perform any maintenance, repairs or other work on service lines, it is obviously necessary to be able to shut off the supply of incoming gas so as to prevent any inadvertent leakage. Heretofore, it has generally been necessary to dig about and isolate the gas main at the area in which it is connected to the service line. The connection between the main and the service is known as a "tee", and nearly always includes a shut-off valve. After the tee is closed, the service line may then be accessed or breached and worked on as may be necessary.

It is known to those acquainted with this art that the above-described isolation procedure is an extremely expensive undertaking in nearly all aspects. Initially, local municipalities require construction permits for excavation. These permits often cost up to about $200.00 or more, each. Additionally, gas mains are usually located approximately six feet below ground level and often run both parallel to and beneath existing roadways. Since these gas mains have been laid under roadway surfaces, asphalt, brick, concrete and the like must be removed in order to isolate the service tee. Further, since these gas mains have often been installed in early communities in early 1900s, and sometime even in the previous century, precise and exact knowledge of their where to best dig for the gas main itself is often a matter of guesswork, let alone the decision of where along the main to locate the service line tee. Accordingly, these procedures are not jobs to be taken lightly, especially in cold, hot or even mildly inclement weather and certainly not be attempted at all in sub-zero temperature conditions.

Although not affecting either the physical condition of the service line or the gas main, it is also necessary to shut off the gas flow when replacing a defective gas flow meter or removing one for service. This can, however, generally be accomplished from inside the gas-supplied structure without disrupting any of the service line, the roadway or the surrounding neighborhood. However, interrupting the service for such a temporary event does result in significant repercussions in that the gas lines within the structure must now be bled of atmospheric air and, of course, each service pilot which is fed off those lines must then be relit. The bleeding procedure often cannot be properly accomplished in one visit within any reasonable length of time and so multiple repeated service calls are required. This unavoidably results in both unnecessary consumer aggravation and increased utility expense. Thus, the various requirements of diverting commercial traffic, providing alternate access for local traffic and the expense of restoring the roadway surface to at least its former state, as well as the necessity of repeatedly rescheduling the return of work crews to previous job sites in order to correct earlier work has provided the impetus for the present invention.

SUMMARY OF THE INVENTION

The present invention provides an apparatus and a process for working on a service line irrespective of either climate or weather conditions.

The present invention provides an apparatus and a process for shutting off gas flow to the service line without requiring direct access to the gas main.

The present invention provides an apparatus and a process for renewing a defective service line without removing or displacing that service line.

The present invention provides an apparatus and a process for shutting off gas flow to a service line and then physically disconnecting segments of that line without direct access to either the gas main or the service line.

The present invention provides an apparatus and a process for restoring gas flow to disconnected service lines without direct access to either the gas main or the service line.

The present invention provides an apparatus and a process which permits the replacement or servicing of a gas meter without disrupting the constant supply of gas to appliance and equipment standing pilots. The present invention provides an apparatus and a process for physically reconnecting previously disconnected service line segments without direct access to either the gas main or the service line.

Accordingly, these features and others are provided by the present invention which is used while gas is free flowing from the underground main without, however, letting gas escape. The present invention utilizes a first valved gas lock device, one end of which sealingly engages a house tee and the other end of which sealingly engages various useful tools. A tee plug tool allows the removal of a house tee plug. The service line is inspected using an in-line camera to determine if the service and the main tee are in an appropriate condition for restoration.

If the service and main tee are in an acceptable condition, a stopper insertion tool is then used to insert a stopper within the gas service so that the first gas lock may itself then be removed. The gas supply meter house service is disconnected from the house tee and the house tee is removed from the service.

A second valved gas lock is then utilized which sealingly engages the plugged service line. The stopper tool is installed on this second gas lock and the stopper insertion tool is then used to remove the installed stopper from the gas service. The stopper tool is then removed from the gas lock.

An auger is then used to clear the service of any excessive debris and the service is deburred of any significant internal protrusions or pipe edges. The bonding site is then finely reamed in order to receive an internal sealing plug. Finally, the service and bond site are repeatedly brushed and all loosened material is removed from the service.

The service line is preheated at the cleared bonding site so that it will readily and permanently accept the plug. The plug is then inserted into the service either to the location of a service-perforating corrosion or up to the main tee, and the plug is heated. Heating the plug both releases the plug material and the coiled expansion springs within its construction in addition to activating a sealing adhesive which surrounds it, thus to seal the service from the main.

An internal pipe cutter is then inserted into the service line and the service line is severed downstream of the bonded plug when a building or structure is to be demolished or moved. Otherwise, a hole saw is inserted through the service into the sealing plug in order to pierce a hole in the nose of the plug so as to reestablish gas flow to the disconnected or now repaired service line.

In view of these procedures, the present invention is not, of course, employed if the service line condition at the bond site is extremely poor or if the main tee is itself leaking. Additionally, it may prove difficult to utilize the present invention if the service line is acutely angled, if the gas lines utilize curb valves or if there is insufficient work space within the house or structure. In these instances, prior art excavation techniques must be utilized.

BRIEF DESCRIPTION OF THE DRAWINGS

FIG. 4 is an elevation view of a mulcare plug tool and the present invention;

FIG. 5 is an elevation view of a second gas lock of the present invention:

FIG. 6 is an elevation view of a pipe inspection site camera of the present invention:

FIG. 7 is an elevation view of a flexible conduit of the present invention;

FIG. 8 is a cut-away end view of the flexible conduit of the present invention taken along the line 8—8 of FIG. 7;

FIG. 9 is an elevation view of a conduit gas lock adapter of the present invention;

FIG. 9A is a cut-away view of an internal seal of the gas lock adapter of FIG. 9;

FIG. 9B is a front elevation view of a ring seal of the internal seal of FIG. 9A;

FIG. 9C is a cut-away view of the ring seal of FIG. 9B;

FIG. 10 is an elevation view of a tool holder extender of the present invention;

FIG. 11 is an elevation view of a service auger of the present invention;

FIG. 11A is an elevation view of a tap of the present invention;

FIG. 11B is an elevation view of a reamer-deburrer of the present invention;

FIGS. 12 and 13 are respectively elevation and top plan views of a replaceable blade deburrer of the present invention;

FIG. 14 is an elevation view of replaceable blade knurled reamer of the present invention;

DETAILED DESCRIPTION OF THE INVENTION

Figure 1:
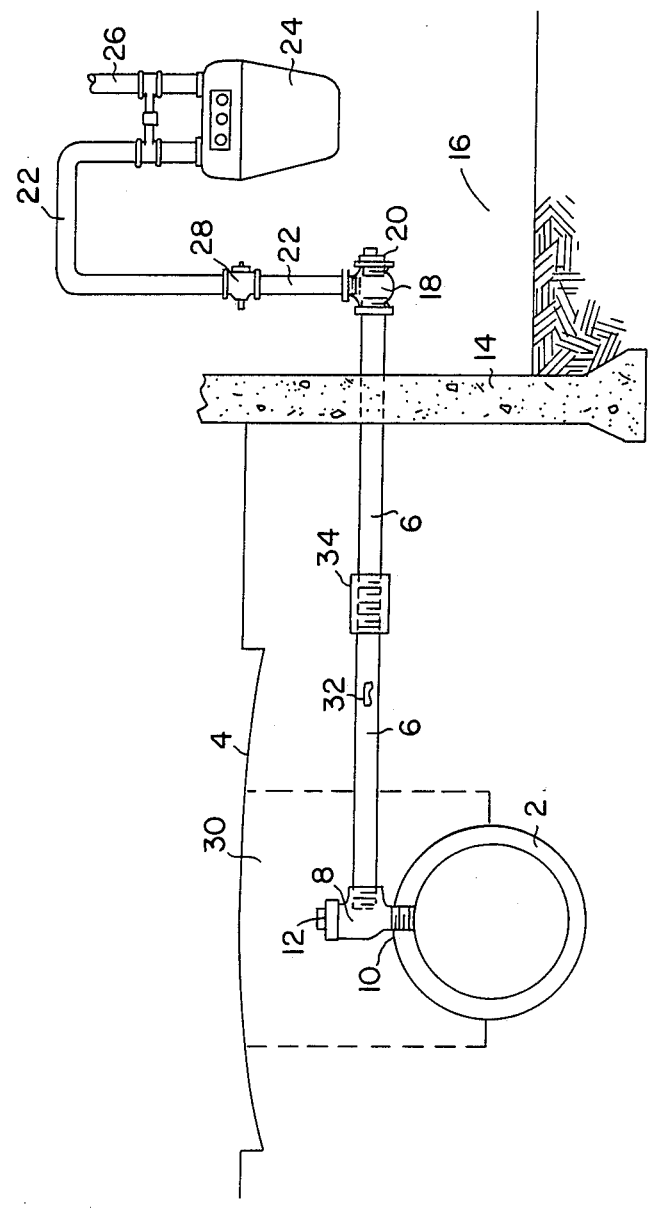
FIG. 1 is a schematic elevational view of a conventional gas delivery system in which the present invention may be utilized.

As is illustrated in FIG. 1, a gas main 2 runs parallel to and beneath roadway 4. Service line 6 extends from main 2 via main tee 8 in twenty foot sections. Multiple sections of service 6 are joined together with threaded couplings 34. Main tee 8 is removably sealed to main 2 by threads 10, although main tee 8 may be sealed to main 2 by any suitable removable or permanent means and is conventionally closed by valve 12. When open, valve 12 provides a gas connection from the interior of main 2 to service 6.

Service 6 desirably runs coplaner with and perpendicularly from main 2 towards the foundation wall 14 of a structure. Service 6 is commonly designated a '1-¼" pipe' and extends through wall 14 into basement 16 to terminate at house tee 18, located up to 100 feet or more from main tee 8. Those skilled in the art will understand that the 1-¼" service 6 pipe actually has a 1-⅜" inside diameter. House tee 18 is provided with a removable tee plug 20 which is threadingly inserted into house tee 18. House tee 18 is also connected to house service line 22, which leads into meter 24 and then to secondary house service line 26. Since house tee 18 is not provided with a cut-off valve, service 6 is always connected to provide gas flow to house service 22. House service 22 may be, however, disconnected from meter 24 via house valve 28.

Therefore, in order to shut off valve 12 and preclude gas flow to secondary service 26, for example, in case of customer delinquency, it is clear that house valve 28 may not effectively be used, since valve 28 is readily accessible to the delinquent customer. Additionally, since valve 28 is downstream of service 6, in the event that service 6 is damaged by, for instance, perforating corrosion 32, valve 28 cannot stop gas flow for repair of any damaged sections of service 6. Therefore, in practice, it has been necessary to first excavate access hole 30 in order to locate main tee 8. Unfortunately, since service 6 does not always run perpendicularly to main 2, merely locating main 2 in front of house tee 18 does not automatically locate main tee 8. Accordingly, main tee 8 is often located by first digging and then extending hole 30 along the length of main 2 until main tee 8 is discovered. Main tee 8 may then be shut off, discontinuing utility service.

The present invention allows, for example, perforating corrosion 32 to be repaired without requiring access to valve 12. Access to valve 12 is not even required in the event that service 6 is to be plugged and radially severed from main 2. The present invention, therefore, enables the repair or plugging of service 6 even while line 2 continues to supply service 6 with gas. This is known as procedures as in U.S. Pat. Nos. 4,394,202, issued July 19, 1983, 4,410,391, issued Oct. 18, 1983, and 4,487,432, issued Dec. 11, 1984. The present invention will be first illustrated in the context of plugging a section of corroded ferrous service 6 and then severing the service from main 2.

Figure 2:
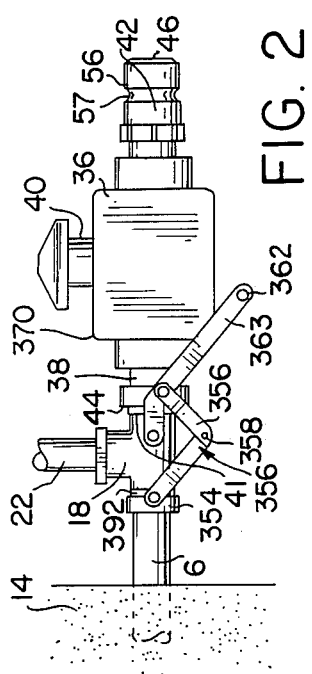
FIG. 2 is an elevation view of a first gas lock of the present invention installed on a conventional house tee.

The plugging procedure begins by entering basement 16 to gain access to house tee 18. Tee plug 20 is repeatedly struck with sufficient light blows using a hammer or other suitable object in order to dislodge any paint or corrosion which might otherwise seal tee plug 20 to house tee 18. Preferably, any such paint and corrosion are removed from tee plug 20 using, if necessary, a wire brush. As much paint and corrosion as is practicable is also removed from house tee 18. House tee 18 and tee plug 20 are both then cleaned up by generally removing loose debris. A device known as a gas lock 36 (best seen in FIG. 2) is then applied to the now-cleaned house tee 18.

Gas lock 36 integrally consists of the following three general sections: tee clamp 38, ball valve 40 and seal assembly adapter 42. Clamp 38 allows gas lock 36 to be removably sealed to house tee 18 even without removing tee plug 20. Valve 40 enables gas lock 36 to selectively define a throughgoing gas passage from clamp end 44 to adapter end 46. The gas passage should maintain a clear bore of at least about 1-½ inches so as to best enable tee plug 20 removal and so as to provide ample clearance for other materials, tools and procedures which will be described below. Suitable ball valves 40 are commercially available from Asahi/America Corp., Medford, Mass. 02155. Adapter 42 enables a variety of secondary tools to be sealingly adapted to gas lock 36. Adapter 42 is one-half of a "quik" cam lever coupling which is sold under the Banjo tradename by Terra-Products, Inc., Crawfordsville, IN 47933. The other half of the cam lever coupling is seal jacket 54 and is illustrated, for instance, in FIG. 3 and will be described hereinafter.

Figure 2A:
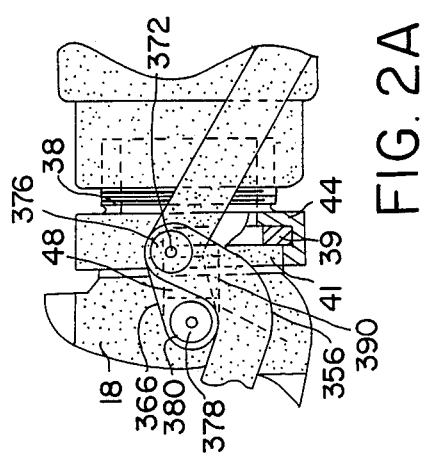
FIG. 2A is a partial cut-away view of the gas lock of FIG. 2.

Gas lock 36 is first abutted against house tee 18 such that clamp end 44 engages and surrounds tee plug 20. As best seen in FIG. 2A, tee clamp 38 features tee sealing gasket 39 to sealingly abut house tee flange 41. Tee latch mechanism 48, best seen in FIGS. 2B–2G is then utilized to sealingly retain clamp end 44 against house tee flange 41.

Tee latch mechanism 48 is provided by a pair of actuating arms 350 and a locking link 352. Locking link 352 is formed by clamp 354 and a pair of clamp arms 356. As illustrated, for example, in FIGS. 2D and 2E, clamp 354 is fixedly attached to clamp arms 356. Although those skilled in the art will recognize that the geometry of latch mechanism 48 may be varied as desired, it is preferred that clamp arms 356 are fixed to clamp 354 at a downward angle of about 15°. In other words, as shown in FIG. 2E, the underside of clamp arms 356 should define an angle of about 75° to arms 354.

Each of clamp arms 356 is provided with an aperture 358 for receiving a tie rod 360 which is secured thereinto by any suitable fastening means such as threaded screws, brazing, adhesives and the like. Tie rod 360 adds desirable rigidity to tee latch mechanism 48 and also serves to limit the travel of locking link 352 by abutting against the downward-facing surface of house tee 18 when clamp 354 is fully engaged. Similar apertures 362 are found within the handle portions 363 of actuating arms 350 so as to securely receive tie rod 364. Tie rod 364 requires that handle portions 363 are always parallel and thus ensures that actuating arms 350 are always displaced in equal amounts. Therefore, clamp 354 cannot be actuated in a crooked fashion, but rather, is always engaged perpendicularly. Ideally, the geometry of these various pieces is selected such that tie rod 364 abuts the underside of gas lock 36 at the same time that tie rod 364 abuts the underside of house tee 18. This, of course, depends in part upon both the angle defined by actuating leg 366 of actuating arm 350 and the dimension of gas lock 36. However, it is preferred that actuating leg 366 be offset from actuating arm 350 by 45°, as shown in FIG. 2F. Moreover, as seen in FIG. 2G, actuating arm 350 features an offset portion 368 to ensure that handle portions 363 clear any protrusions 370 of gas lock 36. In a similar manner, clamp arms 356 are affixed to clamp 354 in an outwardly spreading manner (see FIGS. 2C and 2D) so that clamp arms 356 may easily be assembled to actuating legs 366.

Figure 2B:
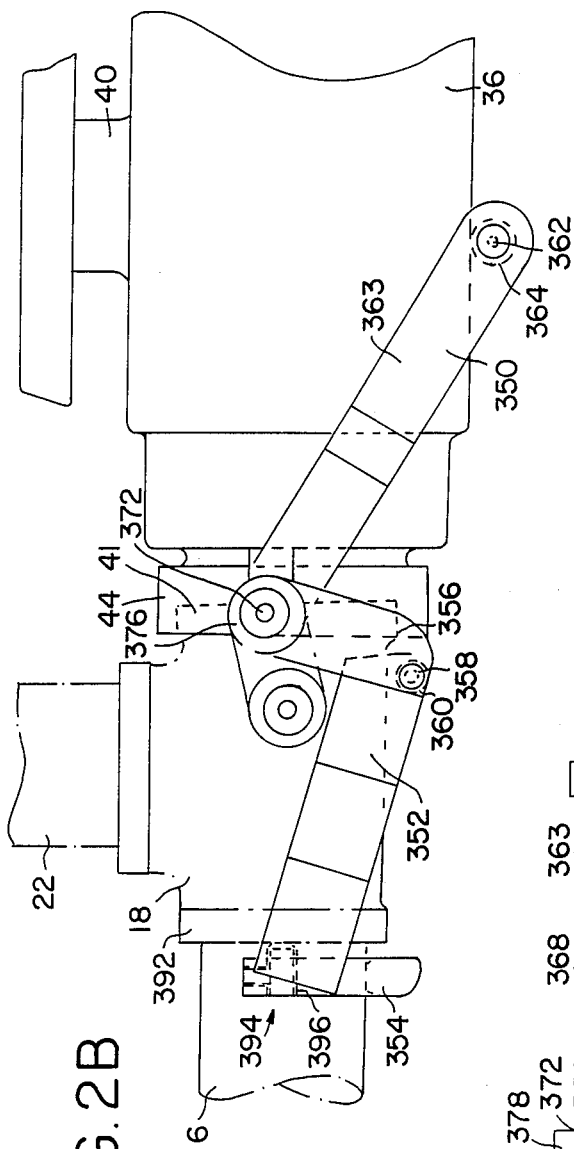
FIG. 2B is a detail elevation view of the gas lock of FIG. 2.
Figure 2C:
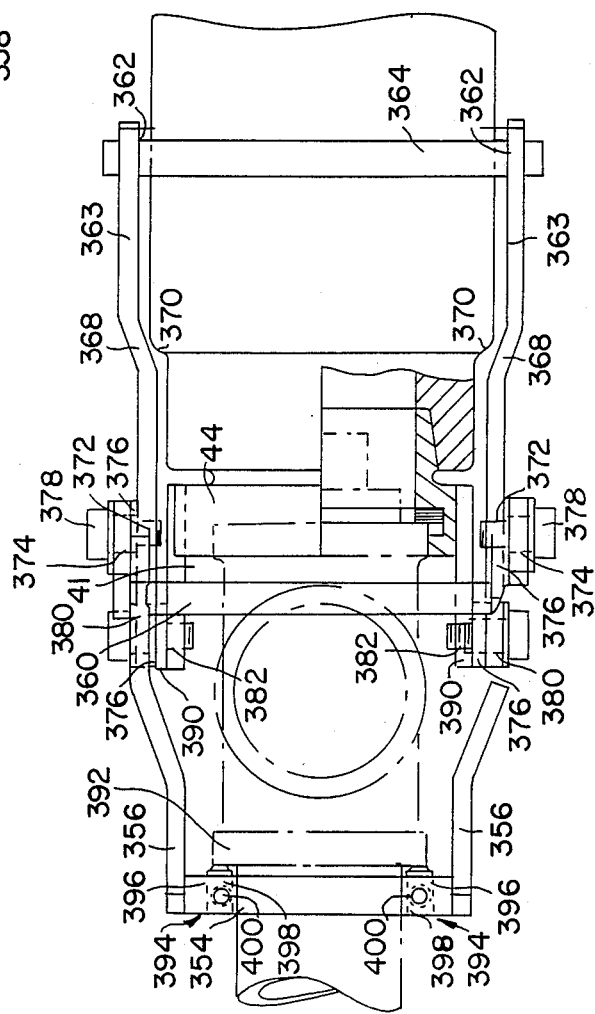
FIG. 2C is a plan view of the bottom of the gas lock of FIG. 2.
Figure 2F:
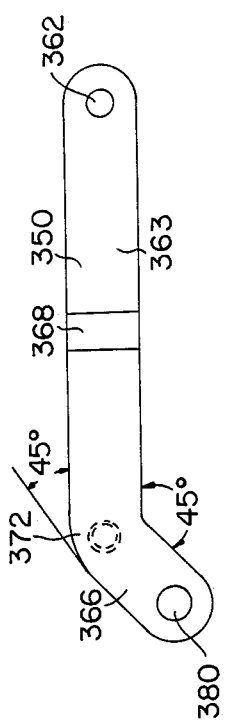
FIG. 2F is a side elevation view of an actuating arm of FIG. 2.
Figure 2G:
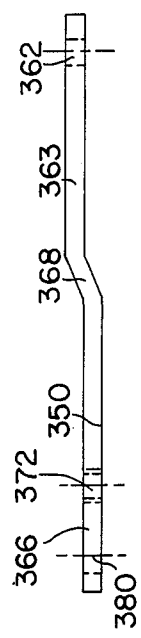
FIG. 2G is a top view of the actuating arm of FIG. 2F.
Figure 2D:
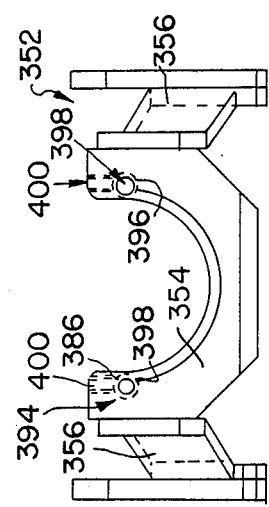
FIG. 2D is a front elevation view of a locking link of FIG. 2.
Figure 2E:
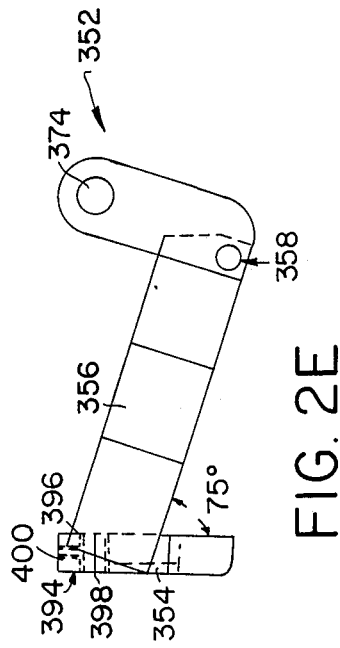
FIG. 2E is a side elevation view of the locking link of FIG. 2D.

As best seen in FIGS. 2B and 2F, actuating lets 366 provide apertures 372 adjacent to handles 363. Additional apertures 374 are provided at the ends of clamp arms 356. Thus, a conventional bearing 376 such as nylon or polytetrafluoroethylene washers and the like may be placed between clamp links 356 and actuating lets 366 concentrically around both apertures 372 and 374 so that suitable retaining means 378 such as screws or rivets may be used to pivotably fasten actuating link 350 to clamp link 356.

Similarly, actuating lets 366 also provide pivot apertures 382 which are adapted to align with pivot brace apertures 382 located in pivot braces 390 which rigidly protrude from clamp end 44 (see FIGS. 2A and 2C). Thus, by inserting bearing 376 concentrically between pivot apertures 380 and pivot brace apertures 382, retaining means 378 may also be used to pivotably fasten actuating arm 350 to pivot brace 390. Thus, it will readily be appreciated that by raising the handles 363 of actuating arms 350 until tie rods 360 and 364 abut house tee 18 and gas lock 36, respectively, clamp 354 may be withdrawn axially in the proximal direction against the distal flange 392 of house tee 18.

However, since various house tees 18 are currently or have previously been commercially available which differ in length from distal flange 392 to proximal house tee flange 41, clamp 354 is also provided with depth adjusters 394. Depth adjusters 394 are formed by threaded apertures 396 which are adapted to accept threaded adjusters 398. Threaded adjusters 398 may then be adjusted so as to abut distal flange 392 and to ensure that gas lock 36 abuts house tee 18 with sufficient longitudinal force so as to seal flange 41 against sealing gasket 39. Desirably, set screws 400 are also provided and can be utilized so as to fix the proper adjustment of threaded adjusters 398. Further longitudinal adjustment is possible by providing that the channel which retains gasket 39 (see FIG. 2A) is, for example, $\frac{1}{4}$" wide. Thus, the channel can accept conventional gaskets of $\frac{1}{8}$, 3/16 and $\frac{1}{4}$" thicknesses, and affords gas lock 36 with even greater adaptability thereby.

Figure 3:
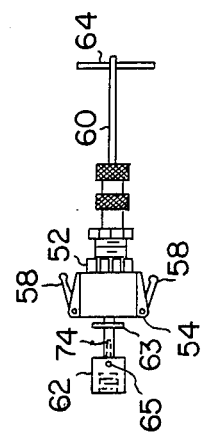
FIG. 3 is an elevation view of an tee plug tool of the present invention.
Figure 3A:
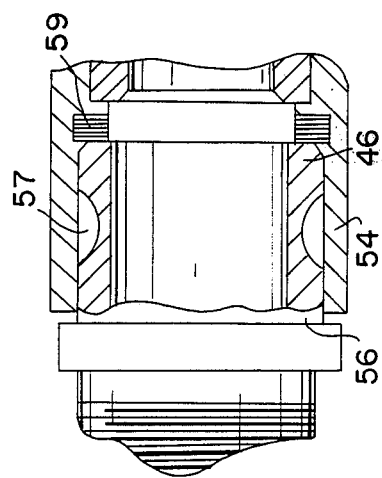
FIG. 3A is a partial cut-away view of the tee plug tool of FIG. 3.

Referring now to FIG. 3, tee plug tool 52 is used to remove tee plug 20. Seal jacket 54 of tee plug tool 52 envelops and engages seal assembly 56 of adapter 42. Clamps 58 are extended towards gas lock 36 in order for tee plug tool 52 to seal against adapter 42. One preferred such mechanism for engagement uses annular retaining channel 57 defined within seal assembly 56. As best seen in FIG. 3A, seal jacket 54 slidably engages adapter end 46 until seal assembly 56 abuts gasket 59. Manually extending clamps 58 then enables cam means (unillustrated) to protrude inwardly into retaining channel 57. The cam means ensure that seal assembly 56 is biased against gasket 59 so as to gas seal tee plug tool 52 to seal assembly 56. Other suitable releasable engaging and sealing devices can, of course, be utilized.

Tee plug tool 52 provides a rotatable and longitudinally reciprocable throughgoing shaft 60 having a handle and a square-ended proximal shaft end 64, as shown, and square-ended distal end. The distal end provides an internally threaded blind (e.g., not throughgoing) bore 74. Threaded bore 74 is preferably tapered such that it defines a frusto-conical aperture in which the widest portion is most distal, as will be explained later. As provided, the distal end is thus adapted to engage either a conventional $\frac{3}{8}$" or $\frac{1}{2}$" drive socket 62 with an imbedded magnet therein, which is in turn adapted to engage tee plug 20. For security, shaft 60 is also fitted with collar 63 so that shaft 60 may not accidentally be withdrawn from tee plug tool 52. Similarly, set screw 65 ensures that socket 62 cannot accidentally be removed from shaft 60. A conventional internal seal (unillustrated) provides a sealing interaction between shaft 60 and tee plug tool 52. Accordingly, when shaft 60 is within tool 52 which is fitted onto seal assembly adapter 42, gas cannot escape from service 6 even if valve 40 is opened. Thus, after tee plug tool 52 is attached to gas lock 36, the assembled pieces define an air-tight apparatus and valve 40 may be opened so as to allow access to house tee 18 via adapter end 46.

Shaft 60 is then slid towards tee plug 20 and rotated by hand until tee plug 20 is engaged, whereupon shaft 60 is rotated counter-clockwise using a "T" bar handle, ratchet, wrench or other suitable drive means on square-ended proximal shaft end 64 in order to remove tee plug 20 from house tee 18. Shaft 60 is then slid back (to the right, as viewed in FIG. 3) so as to withdraw socket 62 to remove tee plug 20 to within seal jacket 54. Magnetic socket 62 may be further assisted in retaining tee plug 20 by placing a small binding amount of putty seal inside socket 62 before engaging tee plug 20. Once plug 20 is within seal jacket 54, valve 40 is closed, clamps 58 are opened and tee plug tool 52 is removed from gas lock 36 along with tee plug 20. Thus, tee plug 20 has been removed from house tee 18 in the preferred hot tap condition without the release of gas.

It is now desirable to examine the inside of service 6 in order to determine if service 6 or main tee 8 is so badly deteriorated as to preclude restoration, as well as to locate any fault within service 6. To that end, the next step utilizes an internal pipe inspection camera 102, illustrated in Fig. 6. Camera 102 is electronically connected to power controller and a viewing monitor (both unillustrated). The power controller and video monitor are also desirably connected to a videocassette recorder so that work crews may then record the condition of service 6.

The proximal end 118 of camera 102 is attachable to a flexible cable conduit or "feed snake" 120, best seen in FIGS. 7 and 8. A desirable conduit 120 is commercially available from the Teleflex Corp. Conduit 120 features a jacket 122 formed of a flexible, resilient rubberized or polymeric material such as polyethylene within which may be laid either a resilient flexible polymeric or spiraled steel annular liner 124. Since the outer diameter of liner 124 is smaller than the inner diameter of jacket 122, an annular channel 126 extends longitudinally throughout conduit 120. Reinforcing wires 128 are frictionally retained and are oriented longitudinally within annular channel 126. Thus, conduit 120 is a flexible assembly which is substantially rigid axially and which defines a throughgoing aperture 130. Conduit 120 is efficiently coiled and carried on any suitable conduit reel such as that disclosed, for example, in U.S. Pat. No. 4,602,752, issued July 29, 1986.

Conduit aperture 130 may be used to house a variety of elements to functionally connect various tools. For instance, in the case of camera 102, a conduit 120 is selected which contains a plurality of electrical wires in order to provide power to camera 102 and transmit images therefrom. Other examples of connecting elements will, of course, be described later.

Camera 102 is provided by a thin longitudinally oriented camera housing 104 which may feature a flexible joint 106 at an intermediate point. Joint 106 better enables camera 102 to traverse minor bends, jogs and angles within service 6. For optimal maneuverability, housing 104 is preferably about one inch or less in diameter and also, is preferably about ten inches long. One such camera is manufactured by the Fairchild Camera and Instrument Corp., Syosset, NY 11791.

Camera 102 also provides a plurality of axially compressible guide rails 108. Guide rails 108 are preferably tensioned at each end and the middle thereof by clamps 110. Preferably, the middle and distal clamps 110 "float", e.g.., are not rigidly affixed to camera 102 but, rather, are movable longitudinally thereon. In contrast, however, it is advantageous if the most proximal clamp 110 only is rigidly affixed to camera 102. Guide rails 108 may be formed, for instance, of spring steel and desirably define a maximum outer radius which is at least about ⅔ of the inner diameter of service 6. Guide rails 108 function to locate camera 102 substantially at or about the longitudinal axis of service 6. Additionally, since guide rails 108 are compressible, they do not preclude camera 102 from passing through most internal obstructions as well as the aforementioned bends, jogs and angles within service 6.

At the front or distal end of camera 102, of course, is located lens 112. A guard 114 is formed of a bent rigid material, preferably metal, so as to best protect lens 112. Guard 114 is not so thick as to disrupt image viewing, but should still provide adequate protection against damage from ramming lens 112 into solid debris and guide camera 102 around obstacles. Guard 114 freely supports a circular member 116 which will, of course, always hang downwardly and thereby provides a simple maintenance-free indicia of orientation for camera 102. It is noted that the camera described herein is usable within service 6 even after a plastic insert pipe has been installed therein.

A conduit gas lock adapter 132 is provided and is best seen in FIG. 9. Conduit gas lock adapter 132, in a manner substantially analogous to tee plug tool 52, envelopes and engages seal assembly 56 of gas lock 88. Clamps 134 are extended towards gas lock 88 in order for adapter 132 to engage assembly 56. Additionally, an internal seal 500, best seen in FIGS. 9A–9C, fits within gas lock adapter and provides a sealing interaction between the outer surface of conduit 120 and conduit gas lock adapter 132 while yet enabling conduit 120 to be both rotated and longitudinally reciprocated.

Those skilled in the art will understand that conduit 120 is not inserted into an assembled internal seal 500 (since the gas tight interference fit therebetween would not allow such insertion). Rather, internal seal 500 is assembled around conduit 120. Thus, it will readily be appreciated that each of the different conduits 120 utilized in these procedures are desirably pre-equipped with their "own" gas lock adapters 132.

Internal seal 500 is generally provided by an assembly of six different parts, e.g., holder 502, large collar clamp 504, small collar clamp 506, split clamp 508, O-ring 510 and two split seals 512. To assemble internal seal 500, two seals 512, best seen in FIGS. 9B and 9C are inserted over the distal end of conduit 120. Seal 512 is desirably a Poly-Pak part No. 25000562 which is commercially available from the parker Corp. However, since such seals 512 are provided with a press-fit internal seal O-ring 514, it is first necessary to remove O-ring 514 and make a single radial slit "a" (see FIG. 9B) before seals 512 may be slid onto conduit 120. After seals 512 have been installed upon conduit 120, conduit O-ring 510 is also slid onto conduit 12. Conduit O-ring. 510 is also commercially available and is preferably part No. K50 of the Miller Production Co. Next, holder 502 is slid onto conduit 120 until it envelops each of conduit O-ring 510 and seals 512, as shown in FIG. 9A. Holder 502 is provided with a smooth internal sealing portion 514. Sealing portion 514 does not, in fact, seal against conduit 12, but is used to orient the conduit 120-sealing members, e.g., O-ring 510 and seals 512 within holder 502. Conduit O-ring 510 need not be split, of course, since the elastomeric construction thereof enables O-ring 510 to be stretched so as to pass over any minor obstructions at the end of conduit 120.

Both halves of split clamp 508 are now installed over conduit 120 adjacent conduit O-ring 510. Split clamp 508 is simply a thick spacer-washer which is completely split once through its diameter. The inside diameter of split clamp 508 is preferably the same or only slightly larger that of either O-ring 51 or seals 512. Next, small collar clamp 506 and large collar clamp 504 are also installed over conduit 120. Each of the collar clamps 506, 504 are also completely split once diametrically. Large collar clamp 504 features four throughgoing apertures 514 and counterbores 516 spaced at 90° rotation, starting 45° from the severed diameter. Apertures 514 and counterbores 516 in large collar clamp 504 are adapted to receive bolts 518 and align with bores 520 within holder 502. Bolts 518, when installed in large collar clamp 504 and holder 22, then enter threaded holes 522 within small collar clamp 506. If desired, of course, safety nuts 524 may also be used even though holes 522 are tapped. It is preferable that large collar clamp 504 and split clamp 508 are oriented such that their split diameters are offset by 90° Additionally, each collar clamp 504, 506 may simply be attached by screws threaded into tapped bores within holder 502. Other conventional ways of fastening internal seal 500 may, of course, be utilized.

Thus, it is seen that by tightening bolts 518, split clamp 508 and small collar clamp 506 will longitudinally compress conduit O-ring 510 and seals 512 such that their inner diameters will shrink and axially press against conduit 120. Preferably, the longitudinal length of sealing portion 514 and the thickness of split spacer-ring 508 are selected such that when large collar clamp 504 and small collar clamp 506 are fully tightened, O-ring 510 and seals 512 provide a gas seal against conduit 512. Finally, it will be appreciated that both of the collar clamps 504, 506 provide inwardly-oriented smooth chamfer surfaces 526. Chamfer surfaces 526 guide conduit 120 within internal seal 500 in both directions and preclude abrasive harm to conduit jacket 122. Thus, it is preferred that the smallest internal diameter defined by chamfer 526 is no larger than at least one of the internal diameter defined by conduit O-ring 510 or seals 512 when internal seal 500 is fully assembled.

A conventional seal (unillustrated) between the elements within aperture 130 and liner 124 at the distal end 138 of conduit 120 prevents gas flow through aperture 130. Accordingly, when conduit 120 is installed within conduit gas lock adapter 132, and conduit gas lock adapter 132 is fitted onto seal assembly 56, gas cannot escape from service 6 even if valve 40 is opened.

When conduit 120 is inserted within conduit gas lock adapter 132, distal end 138 is provided with connector means 140 so as physically to connect a tool or instrument, such as camera 102 to the element within aperture 130. In this instance, camera 102 is used to determine the general condition of the main tee, the interior of service 6, the location..if any deterioration therein and its physical orientation. Since it is essential for either plugging or any service repair operations that service 6 be clean at any ultimate bond sites, it is also desirable that this inspection step be undertaken at both the beginning and completion of the entire operative procedure.

Since the distance from valve 90 to seal assembly 92 may be less than that required to install conduit adapter 132 with camera 102 therein, an adapter extender 142, best seen in FIG. 10 may be installed thereinbetween. Extender 142 is provided by a seal jacket assembly 144 and clamps 146. The seal jacket assembly 144 is integrally attached, via tube 148, to a seal assembly 150. Tube 148 is metal, preferably aluminum, so that it can withstand high heat conditions as will be made clear hereinafter. Extender 142 is installed by first abutting jacket assembly 144 against seal assembly 92 and then engaging clamps 146. Jacket assembly 136 is then abutted against seal assembly 150 and clamps 134 are engaged. Valve 90 may then be opened and camera 102 inserted into service 6. In this regard, referring to FIG. 9, the exact distance which conduit 120 is inserted into service 6 may be measured by distance meter 152. One suitable distance meter 152 is sold by Kabelmat, Inc., Plymouth, MN., as Model No. M-10. Distance meter 152 is provided with drag wheel 154 and meter index 156. Before the initial step and each following step, meter index 156 is reset (or "zeroed") which ensures that, once a particular fault 32 within service 6 has been located, the selected cure may be precisely applied thereat.

The next step relates to the removal of house tee 18 from service line 6. House tee 18 must be removed from service 6, in part, to facilitate the withdrawal of debris from inside service 6 which the physical constants of house tee 18 would not otherwise allow. The process uses a mulcare plug 82, as illustrated in FIG. 4 and a "mulcare plug tool" 66 which is identical to tee plug tool 52 except for deleting magnetic socket 62 and providing a mulcare stopper 76 therefor. Mulcare stoppers are commercially available from the Mulcare Corp. Threaded end 74 threadingly and reversibly engages mulcare stopper 76. Preferably, threaded end 74 provides a left-handed internal thread. Stopper 76 is provided by a stopper shaft 78 upon which a plurality of elastomeric discs 8 are spaced longitudinally apart. Discs 80 are both sized and spaced so as to frictionally engage and seal the inner aperture of service 6 against the flow of gas when stopper 76 is longitudinally inserted therein. Thus, in order to assemble mulcare plug tool 66 for use, magnetic socket 62 is removed from insertion tool 60 and stopper shaft end 82 is threadingly engaged onto threaded end 74. Assembled mulcare plug tool 66 is then abutted against seal assembly 56 of gas lock 36. Clamps 86 are extended towards gas lock 36 in order for gas lock 36 to sealingly engage adapter 42. Valve 40 is opened and mulcare stopper 76 inserted through valve 40, house tee 18 and into service 6. Handle 72 of insertion tool 68 is then rotated clockwise so as to unthread and release mulcare stopper 7. Discs 80 ensure that stopper 76 is frictionally retained within service 6 so that it does not rotate with handle 72. House valve 28 is then shut off so that gas does not escape from the gas-filled house lines and, of course, so that air does not enter such lines. Clamps 86 are then released so that plug tool 66 can be removed from gas lock 36. Handles 363 are then released, allowing clamp 354 to be loosened. Gas lock 36 is removed from house tee 18, allowing house service 22 to be disconnected from house tee 18 and house tee 18 to be removed from service 6 in the conventional manner, leaving mulcare stopper 76 in place sealing the proximal end of service 6.

The removal of house tee 18 allows the installation of a primary gas lock 88, best seen in FIG. 5. Primary gas lock 88 is analogous to gas lock 36 since it includes a valve 9 and seal assembly adapter 92. However, since primary gas lock 88 is adapted to attach directly to service 6 only when house tee 18 is removed, it provides an engaging coupler 94 which is internally threaded so as to reversibly and sealingly engage the externally threaded open end of service 6. Engaging coupler 94 may also feature an internal nylon or elastomeric sealing O-ring or gasket (unillustrated). Extending downward from primary coupler 94, and in gas communication therewith, is dirt leg 96 which may be selectively sealed by port valve 98. Dirt leg 96 may also, of course, be located between valve 90 and adapter 92, if desired. However, since debris within service 6 will be evacuated via dirt leg port 100, it is desirable that dirt leg 96 is located between service 6 and valve 90. Such location ensures that debris is not passed through gas lock 88 where it might otherwise affect the function of valve 9.

After primary as lock 88 is installed on service 6, it is initially required to remove mulcare stopper 76 from within service 6. In this regard, mulcare plug tool 66 is first abutted against seal assembly adapter 92. Since adapter 92 is functionally identical to seal assembly adapter 42, clamps 86 also function to secure mulcare plug tool 66 to primary gas lock 88. Valve 9 is then opened to enable mulcare stopper tool 68 to be inserted through primary coupler 94 and into service 6 until it abuts mulcare shaft end 82. Since the procedure thus far is "blind", it is easier for the technician to align and thread stopper tool 68 around stopper shaft 82 because the previously described frusto-conical threaded bore 74 helps guide shaft 82 into stopper tool 68. Insertion tool handle 72 is then rotated counter-clockwise so as to threadingly retain mulcare stopper 76 within shaft threaded end 74. Alternatively, it is possible to attach mulcare plug tool 66 to primary gas lock 88 and then threadingly engage bore 74 onto stopper shaft 82. Once shaft 82 has been so engaged, primary gas lock 88 can be engaged on seal assembly adapter 92 nd valve 90 opened.

The mulcare stopper tool 68 is then withdrawn, pulling mulcare stopper 76 from service 6 into mulcare plug tool 66. Primary valve 90 is then closed, clamps 86 released and mulcare plug tool 66 is removed from primary gas lock 88. The next step requires that service 6, and especially, the bond adhesion site for the plug for service 6 be cleaned. The particular step which will be utilized, however, depends upon how congested with debris it appeared that the inside of service 6 was when service 6 was initially inspected with camera 102. Initially, however, no matter which step is required, a conduit 120 which provides a rotating flexible drive shaft (unillustrated) within aperture 130 will be installed within conduit adapter 132 and the drive shaft at the proximal end of conduit 120 will be connected to a conventional pneumatic motor. Pneumatic motors with a wide variety of performance characteristics may, of course, be chosen. However, a motor which is preferred will provide approximately 40 inch-pounds of torque at about 2000 rpm. It is desirable that the pneumatic motor can provide such torque during both clockwise and counter-clockwise operation. Such characteristics may, in fact, be provided by some of the larger commercially available hand-ated air drills.

If the inside of service 6 is severely clogged with debris, and particularly if such debris is in the form of large chunks and particulates, auger 158 (best seen in FIG. 11) is installed on conduit 1120. Auger 158 is formed of case-hardened cold-rolled steel and provides a right-hand thread screw 166 which is rotated in a clockwise direction. Therefore, when used to traverse the length of service 6, auger 158 will remove much of the dust, dirt, rust and coal tars therein. Auger 158 is provided by a shaft 160 having a threaded end 162 so as to releasably engage threaded connector 140. It is extremely preferable that after any tool, such as auger 158, is installed on connector 140, that it be more reliably secured thereto by set screw 164 (FIG. 9). Set screw 164 ensures that counter-rotation of the tool can occur either intentionally or accidentally without irretrievably losing such tool within service 6.

If the proximal interior of service 6 is severely corroded or excessively blocked, it may be extremely difficult to feed the distal end 163 of auger 158 thereinto. Thus, tap 650 (see FIG. 11A) may be installed onto distal end 163 of auger 158 and secured by set screw 652. Tap 650 is also formed of case-hardened cold-rolled steel and features the same thread direction as auger 158, so that it tends to feed auger 158 into service 6 while auger 6 looses and removes debris. In this instance, of course, it may not have been possible to previously have utilized camera 102. Accordingly, camera 102 may be first used only after this present step.

Figure 15:
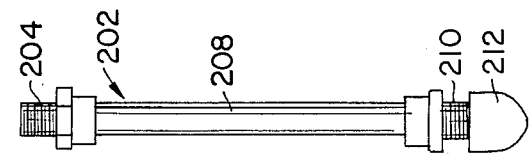
FIG. 15 is an elevation view of a dirt trap of the present invention.

Valve 90 may then be closed so that dirt trap 202 can be removed for emptying. Dirt trap 202, best seen in FIG. 15, is attached by threaded connection 204 to complementary threaded connection 206 provided on dirt leg port 100. Dirt trap consists of an elongated tube 208 which features threaded connection 204 at one end and threaded connection 210 at the other. Cap 212 is provided which is installable on threaded connection 210 and may be removed in order to empty dirt trap 202. It is now estimated that up to about 80% of the debris within service 6 has been loosened and removed within dirt trap 202.

At this stage, whether or not service 6 needed augering, reamer-deburrer 654 (best seen in FIG. 11B) is now installed on a conventional universal joint (unillustrated). The universal joint is not required to traverse bends and the like within service 6. Rather, the universal joint is used because it creates more "slack" in the system, so that deburring may desirably exhibit a more violent motion when rotating than it otherwise might and therefore, deburr more effectively. Reamer-deburrer 654 is provided by a conventional 1-¼" carbide tipped drill bit which has been modified to provide a threaded end 656. Reamer-deburrer 654 is used to traverse the length of service 6 only up to the distance of the pipe joint 4 which inspection camera 102 had previously revealed. Reamer-deburrer 654 quickly bores through and expands such joints 34, but is never inserted further into service 6, of course, since it could easily be used to inadvertently bore completely through main tee 8.

Conduit adapter 132 is then reinstalled on extender 148 and valve 90 is opened. Conduit 120 is inserted until reamer-deburrer 654 clears valve 90 and the pneumatic motor is then started. Conduit 120 is then reciprocated throughout service 6 at most to the depth which inspection camera 102 had previously attained. Reamer-deburrer 654 is intended to substantially remove excess pipe bead and smooth protruding pipe edges within service 6 which result from, for example, careless pipe cutting when service 6 was originally laid. After reamer-deburrer 654 has sufficiently traversed service 6, the pneumatic motor is turned off and conduit 120 is withdrawn. It is preferable that reamer-deburrer 654 makes at least four complete reciprocations of service 6 over any burrs detected by inspection camera 102. Once reamer-deburrer 654 has cleared valve 90, valve 90 is closed, clamps 134 are released and the conduit adapter 132 is removed from extender 142. Reamer-deburrer 654 is then removed from the universal joint. Reamer-deburrer 654 is then replaced on the universal joint with a tapered nylon bristle pipe sweeper brush 214, best seen in Fig. 16. Pipe sweeper brush 214 preferably has a diameter substantially equal to or slightly larger than the inside of service 6. A preferred maximum diameter may be selected, for example, within the range of from 1-⅝ to 1-7/16 inch. Additionally, it is desirable that brush 214 not prevent a constant outside diameter. As pictured, the outside diameter of brush 214 is greatest near its middle, although brush 214 could also reach a maxima at either its distal or proximal end. As with auger 158, nylon brush 214 is preferably handed so as to provide a spiral which is the same as the direction of rotation as the pneumatic motor. In other words, if the motor is made to rotate clockwise, a nylon brush 214 should be selected which features a right-handed spiral so that loosened debris is withdrawn toward basement 16, and not pushed towards main 2. A preferred brush 214 may be provided by mounting 0.014 inch diter nylon bristles on a #8 double stem single spiral wire shaft. Thus, when brush 214 is rotating, loose debris is deposited toward dirt leg 96 and valve 98 into dirt trap 202. It should be noted that unlike the operation of reamer 188, nylon brush 214 is used throughout the length of service 6. Suitable brushes are commercially available from the Mill-Rose Co., Mentor, OH 44060.

It is highly preferable that pipe sweeper brush 214 also be used after each of the following augering and deburring operations. Such extra usage, of course, cleans out service 6 before such deburring or reaming steps which desirably lessens the time which is otherwise necessary for such steps. Additionally, the less debris which is within service 6 tends to decrease the rate of wear of the various cutting edges on replaceable blade deburrer 170 and replaceable blade reamer 188.

Replaceable blade deburrer 170 is now installed on universal joint and conduit 120. Deburrer 170 is formed of a solid billet 172 which defines a blade receiving opening 174. Adjacent blade receiving opening 174 are recesses 176 which are tapped to threadingly engage allen bolts 178. Billet top or "capping" section 180 defines apertures 180 accept allen bolts 178 which center blade 184 within opening 174. Top section 180 also cooperates with indent 183 in blade 184 and key 185 in receiving opening 174 to effectively prevent blade 184 movement therein. The top sections of apertures 180 are wider so as to recess the tops of allen bolts 178 which, when tightened, compress billet top face 182 against blade 184 within blade receiving slot 174, such that blade edges 186 protrude from either side of billet 172. Deburrer 170 is utilized at least at the intended bond site. However, if desired, deburrer 170 may be utilized throughout service 6. After the use of deburrer 170, nylon brush 214 is again used to remove debris from within service 6.

Replaceable blade reamer 188, best seen in FIG. 14 is now installed on the universal joint. Replaceable blade reamer 188 is formed of a base 190 which attaches to the universal joint and which provides a protruding retaining shaft (unillustrated). Reaming bits 192 longitudinally slide onto the retaining shaft but are not rotatable relative to base 190 since retaining shaft does not provide a round cross-section. Cap 194 is threaded so as releasably to engage the retaining shaft and retain reaming bits 192 thereon. Reaming bits 192 provide a substantially round outer cross-section having a rough coarse-knurled periphery 196. Located within periphery 196 are reaming channels 198. Reaming channels 198 provide edges 200 which ream the inside of service 6 and provide an acceptably smooth, clean finish on the surfaces prepared by deburrer 17. Moreover, reaming channels 198 also act as flutes so as to remove debris from the reamed surface of service 6. In contrast to the preceding steps however, reamer 188 is strictly used within service 6 only at the intended pipe plug bonding site. That is to say, reamer 188 need not used to repeatedly traverse the length of service 6. As before, after use, reamer 188 is removed from conduit 120 and replaced with nylon brush 214, which again removes any debris from service 6.

Figures 16, 17:
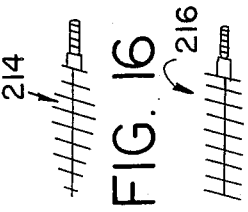
FIG. 16 is an elevation view of a nylon pipe sweeper brush of the present invention.
FIG. 17 is an elevation view of a stainless steel site brush of the present invention.

Tapered nylon bristle pipe sweeper brush 214 is then replaced on the universal joint with a stainless steel site brush 216, best seen in FIG. 17. At this point, service 6 should be nearly 95% or more free of any debris which was originally present. Like nylon sweeper brush 214, stainless steel brush 216 also preferably has a diameter substantially equal to or larger than the inside of service 6 and is used to remove rust oxides. In this regard, a preferred minimum diameter of steel brush 216 is, for instance, 1-¼ inch. Brush 216 is preferably formed of a conventional cylindrical shape with bristles of crimped-type 0.008-0.014" diameter 302 stainless steel mounted on #8 double stem single spiral wire. Such brushes are also commercially available from the Mill-Rose Co , Mentor, OH 44060.

Unlike nylon brush 214, steel brush 216 is primarily intended to remove oxides only from the ultimate bond site of the plugging or repair operation, although brush 216 may be traversed throughout service 6, if desired. Also unlike nylon brush 214, steel brush 216 is preferably handed so as to provide a spiral which is opposite to the direction of rotation as the pneumatic motor. It has been found that about an additional 50% weight of rust oxides may be removed by providing stainless steel brush 216 with the reverse handed spiral, than if the spiral were not so handed. Moreover, the minimal amount of such oxides which are cleared from the bond site are simply deposited in main 2. After the service 6 bonding site has been cleared of rust oxides, stainless steel brush 216 is then withdrawn past valve 90, valve 90 is closed, clamps 146 are released and conduit extender 142 is released from gas lock 88 along with conduit adapter 132. Service 6 is now ready to be either plugged or repaired, as desired.

Figure 18:
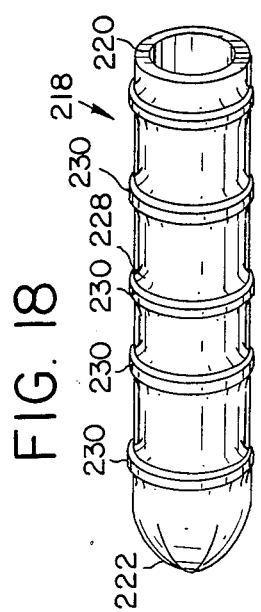
FIG. 18 is an exploded perspective view of a service line plug of the present invention.

In order to seal service 6 from main 2, a plug 218, best seen in FIG. 18, must be annealed to the section of service 6 which has now been reamed, deburred, brushed and cleared of rust. A suitable plug 218 is taught, for example, within U.S. Pat. No. 4,295,494, issued Oct. 20, 1981. Briefly, however, such plug 218 should be self-expanding and thermally activated. Plug 218 may desirably define dimensions of about 1-⅛ inch external diameter and 10 inches overall length. The basic plug material may be of a plastic elastomeric formulation.

Plug 218 is also overcoated with a hot melt adhesive 228 which provides excellent bonding, shear and pressure sealing capabilities. It is preferable that adhesive 228 be solid at room temperature and be a high strength material with hood bonding ability, provide cold flow and embrittlement resistance and resist the varied effects of natural gas, mercaptan odorant, ground water, bacteria, shock and vibration. A class of suitable ethylene copolymer resin adhesives are marketed by E.I. du Pont de Nemours and Company. O-rings 230 envelop the tube of plug 218 and provide sufficient damming surface area to retain additional adhesive 228. Square section O-rings 230 are preferred since they provide even more surface area than round O-rings and are less likely to roll off tube 22 when plug 218 is inserted within service 6.

Ideally, plug 218 expands to produce sealing contact both within service 6 in addition to a short distance within main tee 8 in order to form a sealing ring of adhesive 228 around main tee 8 and the fitting threads thereof.

Figure 19:
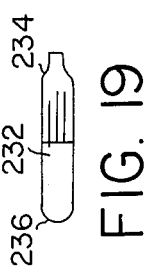
FIG. 19 is an elevation view of a service line preheater of the present invention.

In order to install plug 218 within service 6, service line cartridge preheater 232, best seen in FIG. 19, is attached to a conduit 120 which provides suitable Service preheater 232 is preferably up to about 1-¼ inch in diameter and five inches in length. These dimensions ensure that service preheater 232 can readily traverse the cleared internal bore passage of service 6, including any remaining debris, deposits or obstructions, bends, joints and the like. In this regard, service heater 232 defines a rounded proximal end 234 and a rounded distal end 236 to preclude heater 232 from being hindered by any such obstructions. Moreover, it will be understood that the chosen dimensions of service preheater 232 automatically ensure that similarly-sized plug 218 will also be able to traverse service 6.

Figure 20:
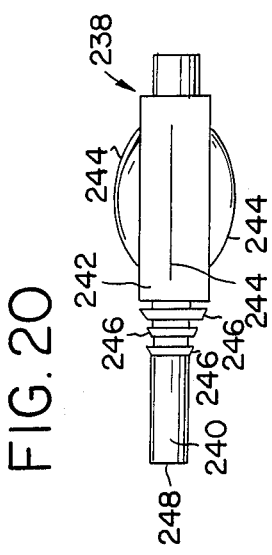
FIG. 20 is an elevation view of a plug heater of the present invention.

Service line preheater 232 should quickly be able to raise the temperature of the inside of service 6 to about 300°-325° F. Ideally, such temperature should be attained within about 20 minutes or less. The service 6 plug bond site is preheated in order to ensure optimal wetting action and to prevent an otherwise unheated service 6 from "heat-sinking" when the plug 218 is itself later heated. Through the use of service line preheater 232, such heat sinking is actually precluded not only by raising the temperature of service 6, but as (or more) importantly, by also heating the ground and moisture surrounding service 6. Service line heater 232 is removed from service 6 after the temperature of the bond site has been raised as desired and preferably, when such temperature has reached equilibrium. Service line preheater 232 is then replaced with plug heater 238, best seen in FIG. 20.

Plug heater 238 provides a heating element shaft 240 and a base area 242. Plug heater 238 provides a portion of longitudinal springs 244 as well as a plurality of concentrically tapered barbs 246. Springs 244 serve to keep plug heater 238, and therefore plug 218 centered within service 6, while barbs 246 mechanically engage the open end of plug 218 and prevent plug 218 from inadvertently being pulled off plug heater 238. Ideally, base area 242 is sufficiently thick to preclude plug heater 238 from entering an excessive distance into plug tube 220. In this regard, shaft 240 is short enough to provide that distal tip 248 thereof does not touch closed end 222 of tube 220. Therefore, plug 218 is able to expand in diameter and also shrink in a longitudinal direction when heater 238 is activated without incurring any sort of binding interference from plug heater 238.

Plug heater 238 is inserted into service 6 until plug 218 reaches the previously cleaned and preheated bonding site. As always, this location is precisely determined using distance meter 152, discussed previously. Electrical power is then provided to plug heater 238, which quickly reaches its operating temperature which is held for twenty minutes. Ideally, it should take no longer than 5-7 minutes to energize plug heater 238 after preheater 232 is removed. By this time, the temperature of the inside pipe surface at the previously preheated bonding site will probably have dropped to approximately 150°-160° F. The particular temperature drop depends, of course, upon the length of time required to insert plug 218 within service 6, and also upon the ambient ground temperature and moisture content surrounding service 6. In any event, any preheating of the bonding site always decreases the "heat sink" effect of service 6 so that plug 218 may be installed more effectively. Additionally, the hot melt adhesive 228 should not contact a comparatively chilled bonding site surface, so that the hot melt adhesive 228 can better wet and adhere to the bonding site.

Figure 21:
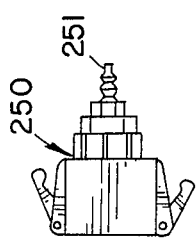
FIG. 21 is an elevation view of a pressure test adapter of the present invention.

Plug heater 238 remains energized for approximately twenty minutes after the inside temperature of service 6 reaches from 185°-200° F. Such temperatures ensure that hot melt adhesive 228 flows well, since it flows at approximately 175° F. Such temperature is, of course, easily attained within the interior of service 6. Plug heater 238 is then removed from service 6 and electrical power to heater 238 is disconnected. Plug heater 238 is then withdrawn past valve 90 and valve 90 is closed. Conduit adapter 132 is removed from gas lock 88 and from 20-30. minutes (depending upon weather and ground conditions) are waited until plug 218 and hot melt adhesive 228 have cooled. At this point, camera 102 is then reinstalled on conduit 120 and reinserted within service 6 to verify that plug 218 appears to be well fixed at the bond site. A plug 218 which is properly inserted by the previous procedure would ideally be able to provide a useful seal at a pressure of up to about 12 inches water column over a temperature range of from 0°-140° F. However, the effectiveness of the installation of plug 218 cannot be so tested. Rather, the permanence of the installation of plug 218 is tested by checking for a blow condition. Thus, an additional hour is waited for plug 218 and service 6 to completely cool so that the plug bond is thoroughly set. Pressure test adapter 250, best seen in FIG. 21, is then installed on gas lock 88. Pressure test adapter 250 is a seal jacket 54 (previously described) which has been capped and fitted with a gas tap 251. Soap water solution is applied to gas tap 251 and valve 90 is opened. If bubbles are formed at gas tap 251, it is clear that plug 218 is not properly installed and a second plug should, of course, be fitted downstream thereof.

Figure 22:
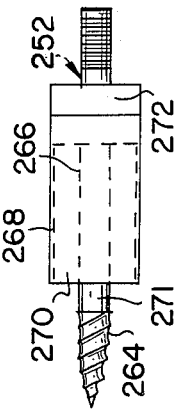
FIG. 22 is an elevation view of a hole saw of the present invention.

In the event that plug 218 has been installed in order to discontinue utility service to a delinquent customer, such operation has been completed. However, should the delinquency be paid up so that the gas supplier wishes to reinstate utility service, closed end 222 of installed plug 218 may be penetrated by a conventional mechanical penetrating device, such as a ⅞" hole saw 252, best seen in FIG. 22. Hole saw 262 provides a mechanical penetrating device 264 and a plug cutter 266. Plug cutter 266 is formed by a sharpened cylindrical wall 268. Wall 268 defines an annular void 270 around penetrating device 264 and is attached to device 264 by plug 272. Hole saw 252 features coupon retaining section 271 and is particularly preferred to other devices, since it both opens a large aperture and still captures the cut slug of plug 218. Thus, service 6 is not littered with unnecessary plug debris. Penetrating device 264, of course, works in conjunction with the equipment described above.

If utility service is to be discontinued for a prolonged length of time, many local statues require that service 6 be physically severed from main 2. This requires that an internal pipe cutter (unillustrated) be installed on conduit 120. A suitable internal pipe cutter is disclosed, for example, in U.S. Pat. No. 4,369,573, issued Jan. 25, 1983. Preferred cutters are smaller than about 1-¼ inch diameter and 18 inches overall length. Particularly preferred cutters also lock themselves into the radially expanded position for more efficient cutting operation. It is preferable that a conventional spring-loaded self-centering device be utilized adjacent the pipe cutter to keep such cutter oriented along the longitudinal axis of service 6. Similarly, it is desirable that a longitudinal fixing device also be utilized adjacent the pipe cutter. The longitudinal fixing device may be provided, for example, by a mulcare stopper 76 which is modified by piercing discs 80 so that stopper 76 may be inserted into service 6 without compressing the air therein. Stopper 76 is also modified so that the pipe cutter may rotate without losing stopper 76 within service 6. This may be attained, for example, by allowing discs 80 to rotate on shaft 78 and by fixing threaded end 74 to the pipe cutter using a set screw arrangement. Therefore, the pipe cutter may be both laterally and longitudinally fixed within service 6. Preferably, the pipe cutter is located in between the centering device and the fixing device. Most preferably, the fixing device is located at the distal end of the pipe cutter. Many local ordinances and statutes require that abandoned services 6 be severed at two separate locations close to main 2. Accordingly, the internal pipe cutter may then be withdrawn a few inches and the cutting procedure may be repeated. Internal pipe camera 102 should then be employed in order to insure that the service 6 cuts are actually complete.

It will now be explained that by altering the above-described operation, service 6 may be relined, i.e., entirely renewed. At this stage, of course, service 6 has been augered (if necessary) and deburred, and at least the bonding site has been reamed. Service 6 has also been swept clear of debris and the bond site is currently being preheated.

Figure 23:
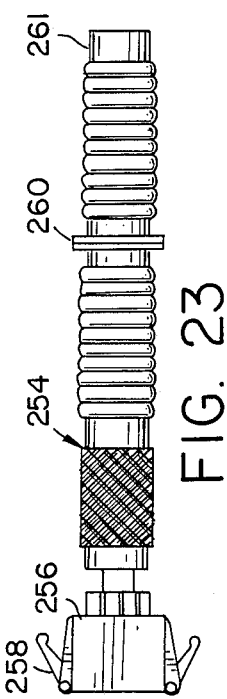
FIG. 23 is an elevation view of a snorkel adapter of the present invention.

A section of relining plastic pipe (unillustrated) is now inserted through a snorkel apparatus 254, best seen in FIG. 23. The plastic pipe is of any suitable material, preferably high density polyethylene resin. One suitable pipe features a 1-⅛" outside diameter and a 1" inside diameter and is known as Driscopipe 8000 and is commercially available from the Phillips Driscopipe Co., Richardson, TX 75083. Snorkel 254 provides a jacket assembly 256 with clamps 258 in order to engage seal assembly adapter 92. Snorkel 254 also provides an extendible, flexible support 260 with a conventional gas seal 261 through which the relining pipe may be inserted. After the pipe is inserted through gas seal 261 into support 260 so as to extend through jacket 256, such end is bonded to the open end of a short section of plastic pipe bonded to open end 220 of a plug 218, which assembly (unillustrated) is called a "pigtail".

Pintails are not assembled in the field, of course, so that plug 218 cannot be accidentally activated while not yet inserted within service 6. The pipe may be bonded to plug 218 using any conventional connector, such as that disclosed within U.S. Pat. Nos. 4,657,287, issued Apr. 14, 1987 or 4,465,309, issued Aug. 14, 1984. Thus, after the pigtail is bonded to the plastic pipe, jacket assembly 256 is extended over plug 218, while the pigtail/plastic pipe connector is within the snorkel assembly, allowing gas seal 261 to seal around the plastic pipe.

Figure 24:
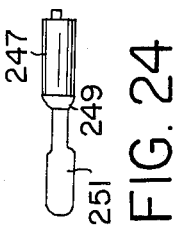
FIG. 24 is an elevation view of a relining pipe plug heater of the present invention.

Service line preheater 232 is now removed from service 6, jacket assembly 256 is abutted to seal assembly 92, and clamps 258 are engaged. The plastic pipe/plug 218 assembly is then inserted through service 6 until plug 218 reaches the preheated bond site. The plastic pipe is then cut off from its feed roll adjacent pipe seal 261. A plug heater 247 (best seen in FIG. 24) is fed through the relining pipe assembly until base area 249 abuts upon plug 218, whereupon heater 238 is energized and plug 218 sealed to the bonding site. As noted in FIG. 24, plug heater 247 only provides a shortened plug heating area 251, so as to ensure that the area of plug 218 which is bonded to the short section of pigtail pipe remains undisturbed.

After waiting 20–30 minutes, plug 218 has then sufficiently cooled that camera 102 may be inserted within the plastic pipe to determine that plug 218 is completely expanded and that the plastic pipe/plug 218 joint is intact. Jacket assembly 26 is then disengaged from seal assembly 92 and the service pipe is cut so as to protrude a predetermined distance from service 6. It is now necessary to test the service pipe insert to ensure that the plug 218 is adequately sealed to service 6. Therefore, a small amount of duct seal (John Mansville Corp.) is applied within the annular area defined by the plastic pipe end within service 6. A small hole is pierced through the duct seal and soap solution is applied. If no bubbles form, of course, plug 218 is properly installed. Similarly, duct seal may be similarly applied across the opening of the plastic pipe to ensure that plug 218 was not accidentally pierced by plug heater 247.

A relining house tee (unillustrated) known as a Posilock basement tee, sold by the Inner-Tite Corp., Springfield, N.J. 07081, is installed upon the threaded end of service 6 within basement 16. Such relining house tee functionally differs from house tee 18 by providing an internal ledge or flange so as to engage and support the proximal end of the plastic relining pipe. This flanged support is commonly required by local code in many municipalities. House service 22 is then connected to the relining house tee and a third gas lock device (unillustrated) is installed on the relining house tee. The third gas lock differs from gas lock 36 only in being sized to specifically engage the dimensions of the relining house tee.

Figure 25:
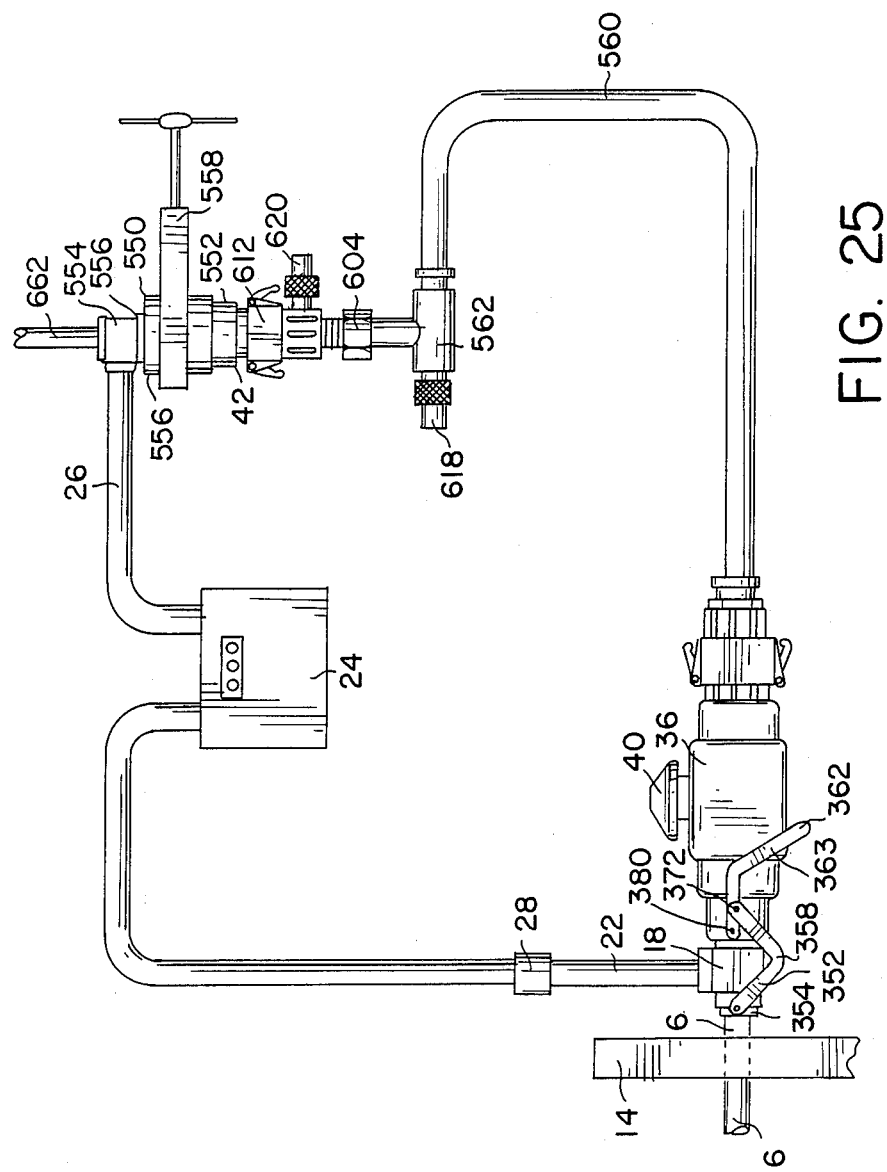
FIG. 25 is a schematic view of a gas meter bypass of the present invention.

Gas tap 250 is now installed on the third gas lock and the relined service 6 tested to ensure that the installation of the relining house tee did not displace installed plug 218, by repeating the previously-described soap bubble test. After passing such test, in order to finish the installation of the plastic relining pipe, the sealed end 222 of plug 218 must be opened up to restore gas flow. This process utilizes hole saw 262 in the manner described previously. Valve 90 is then closed, clamps 146 are released and extender 142 is removed from gas lock 88. Tee plug 20 is then reinstalled. Finally, it will now be explained how the present invention may be utilized in order to replace gas meter 24 in a hot tap mode without discontinuing or interrupting gas flow to standing pilots. As illustrated schematically in FIG. 25, gas lock 36 has been used to remove tee plug 20 from house tee 18 as described previously. Of course, if service 6 has previously been relined with plastic pipe, the third gas lock will have been installed on the relining house tee in a similar manner.

A conventional drip let (unillustrated) will then be grasped with, for example, slip-lock pliers and loosened slightly, such that when the drip leg cap is turned, the drip leg will rotate in the drip leg tee 554, rather than the drip leg cap rotating on the drip leg. Of course, if tee 554 merely has a tee plug (unillustrated), such plug need only be loosened in the previously described manner.

Figure 27:
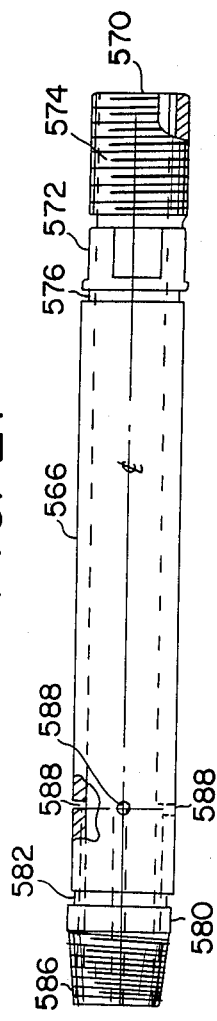
FIG. 27 is an elevation view of an outer gas wand of the present invention.
Figure 28:
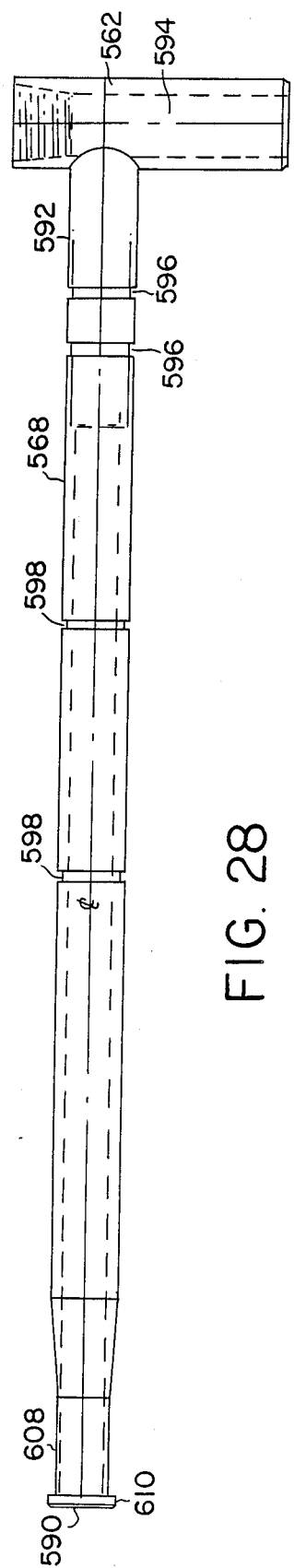
FIG. 28 is an elevation view of an inner gas wand of the present invention.

Elastomeric seal 550 of drip leg valve: 552 is then placed over drip leg tee 554. Seal 550 is attached to both drip leg valve 552 and drip leg tee 554 by any manner, desirably using hose clamps 556. Drip leg valve 552 features both a conventional gas-tight sliding gate valve 558 and adapter 42. Thus, by the use of a suitably modified tee plug tool 52, the loosened drip leg may easily be removed. Gate valve 558 is then closed and tee plug tool 52 is removed from drip leg valve 552. Preferably gate valve 558 features a rotating handle, so that it may be conveniently operated without interference from the basement walls or pipes thereon. Air from within drip let valve 552 does not, of course, flow into secondary service 26, since the gas supply is pressurized somewhat, whereas any air in drip let valve 552 is only at atmospheric pressure. Gas lock 36 is then connected to drip leg valve 552 by flexible 1" (inside diameter) gas transfer hose 560 and gas wand 564, best seen in FIG. 26. Gas wand 564 consists of an outer wand 566 (FIG. 27) and an inner wand 568 (FIG. 28) extending therein. Outer wand 566 is formed by a tube providing a throughgoing longitudinal bore 570. The proximal end 572 of outer wand 566 features threads 574 and circumferential groove 576, which contains snap ring 578. The distal end 580 of outer wand 566 provides a threaded tapered end 586 and circumferential groove 582 which retains snap ring 584. Proximal of channel 582 are a plurality of axial bores 588 which provide a fluid connection from the exterior of outer wand 566 to bore 570.

Inner wand 568 is provided by a throughgoing longitudinal bore 590. At the proximal end 592 of inner wand 568 is transfer tube 562, which itself provides a throughgoing longitudinal bore 594 which is fluidly connected to bore 590. Also located on wand 568 are circumferential grooves 596 and 598. Grooves 596 are used to retain snap rings 600, and grooves 598 are used to retain O-ring seals 602. Snap rings 600 laterally retain threaded collar 604 on inner wand 568. Additionally, seals 602 provide a gas seal between inner wand 568 and outer wand 566, when wands 566, 568 are assembled. Elastomeric plug 606 is also fitted onto the distal end 608 of inner wand 568, when such wands 566, 568 are assembled, and is retained by lip 610.

Figure 26:
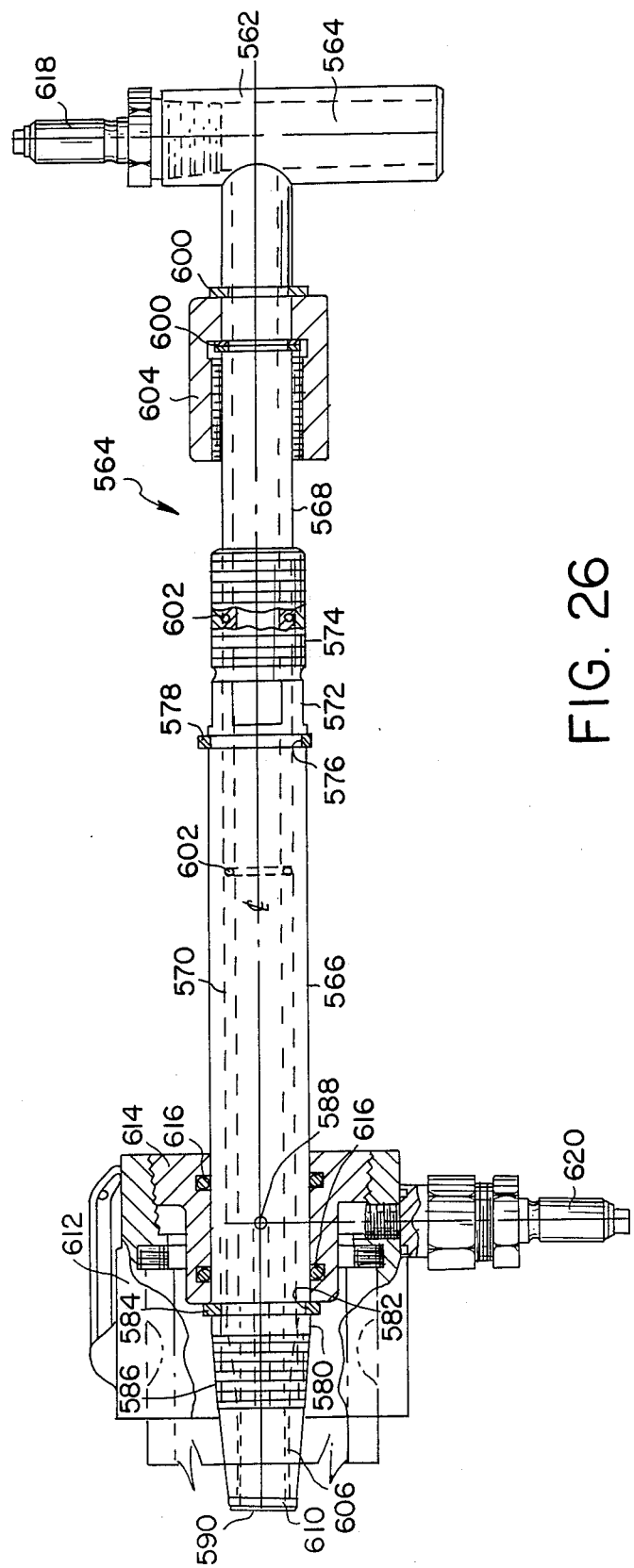
FIG. 26 is an elevation view of a gas wand of the present invention.

As shown in FIG. 26, outer wand 566 is inserted into a wand seal jacket 612, which is analogous to previous seal jacket 54. Seal jacket 612, however, features plug seal 614 with internal O-rings 616 so as to provide a gas seal with outer wand 566. Snap ring 584 is thereby used to preclude outer wand 566 from being withdrawn from seal jacket 612. Similarly, plug 606 precludes inner wand 568 from being withdrawn from outer wand 566. Finally, transfer tube 562 and seal jacket 612 provide conventional statically closed (compressed-air hose) snap fittings 618, 620, respectively.

Now that gas lock 36 is connected to drip leg valve 552 by gas transfer hose 560 and gas wand 564, air within seal jacket 612, wand 564 and gas hose 650 must be evacuated. Therefore, a hose is attached to snap fitting 618 and led outside of basement 16. Valve 40 is opened and backflow of gas from service 6 will evacuate air from gas lock 36, hose 560, bore 590 and seal jacket 612 through snap fitting 618. By inserting inner wand 568 into outer wand 566 (leftwardly, as viewed in FIG. 26), bores 588 move leftward of seals 616 into seal jacket 612. Thus, air within the annular chamber defined by inner wand 568 and bore 570 is also evacuated. Once a gas quality meter indicates that flow from snap fitting 618 is pure gas, the hose attached thereto is removed, automatically shutting off gas flow therefrom.

Outer wand 566 is then inserted through gate valve 558 until threaded section 586 engages the threads of tee 554 which previously retained the drip leg. Wand 566 is then rotated so as to be integrally and rigidly threadingly retained on tee 554, and inner wand 568 is then inserted further into outer wand 566. Threaded collar 604 then engages threaded section 574 and is used to control the movement of inner wand 568. As inner wand 568 moves further inward, stopper 606 abuts the inner edge fuel pipe 622 (see FIG. 25). As collar 604 in tightened, gas flow from service 26 is, of course, eliminated and feed pipe 622 is thus supplied solely via hose 560 and bore 590. Meter supply valve 28 (see FIG. 1) may then be closed and meter 24 may be removed for service or can be replaced.

After meter 24 has been reinstalled, the gas meter-bypass equipment is to be disconnected and removed. First, however, it is necessary to evacuate air within both meter 24 and service 26. Therefore, a hose is attached to snap fitting 620 and led outside. Valve 28 in then opened and any air is purged by being forced through seal jacket 612 to snap fitting 620. When such flow is determined to be pure gas, the hose is disconnected and snap fitting 620 automatically closes. Threaded collar 604 is then loosened and inner wand 568 is withdrawn. When snap ring 584 again abuts plug seal 614, valve 40 and slide valve 558 are closed. Hose 560 and gas wand 564 are then removed. Tee plug 20 and, finally, the water trap cap are both replaced. Accordingly, the present invention has provided equipment and a procedure to remove and replace a gas meter without the interruption of gas service.

It will be appreciated that various modifications of the foregoing apparatus and procedures are within the purview of those skilled in the art and those modifications and the like are intended to be covered by the following claims:

We claim:

1. A process for plugging a service line having a bore which fluidly connects a main at one end and a tee at another end, said tee having a tee plug within an aperture therein, said tee plug preventing said bore from fluidly communicating with an atmosphere about said tee, said process being accomplished solely from the tee end of the service line and comprising the steps of:
    removing said tee plug from said aperture in said tee without allowing said bore to fluidly communicate with said atmosphere;
    inserting an unactivated sealing plug into said service line without allowing said bore to fluidly communicate with said atmosphere; and
    activating said sealing plug, wherein said main and said service line are filled with a fluid and said process occurs with the release of substantially none of said fluid.

2. The process of claim 1, further comprising removing said tee from said other end of said service line after said tee plug has been removed.

3. The process of claim 2, further comprising augering said service line to remove loose debris therefrom after removing said tee from said service line.

4. A process for plugging a service line which fluidly connects a main at one end and at tee at another end, said tee having a tee plug, said process being accomplished solely from the tee end of the service line and comprising the steps of:
    removing said tee plug from said tee;
    augering said service line to remove loose debris therefrom;
    inserting an unactivated sealing plug into said service line; and
    activating said sealing plug, wherein said main and said service line are filled with a fluid and said process occurs with the release of substantially none of said fluid.

5. The process of either of claims 2,3 or 4 further comprising deburring beads within said service line before said unactivated sealing plug is inserted into said service line.

6. The process of claim 5, wherein said service line is deburred using a deburrer with a universal joint.

7. The process of claim 4, further comprising deburring a bonding site within said service line after deburring said beads, wherein said sealing plug is to be thermally activated at said bonding site.

8. The process of claim 7, wherein substantially the length of said service line from said tee end to said bonding site is deburred after deburring said beads.

9. The process of claim 7, wherein said bonding site is reamed after it is deburred.

10. The process of claim 7, further comprising sweeping said service line of deburred debris before inserting said sealing plug into said service line.

11. The process of claim 10, wherein said service line is swept using a nylon brush.

12. The process of claim 8, wherein said bonding site is brushed to remove rust oxides therefrom after sweeping said service line.

13. The process of claim 12, wherein said bonding site is brushed using a metal brush.

14. The process of claim 12, wherein said bonding site is brushed using a metal brush with a predetermined twist, said brush being rotated in an opposite direction thereto.

15. The process of claim 4, further comprising physically severing said service line after activating said sealing plug.

16. The process of claim 14, further comprising integrally examining the interior of said service line after the physical severance thereof.

17. A process for relining a service line having a bore which fluidly connects a main at one end and a tee at another end, said tee having a tee plug within an aperture therein, said tee plug preventing said bore from fluidly communicating with an atmosphere about said tee, said process being accomplished solely from the tee end of the service line and comprising the steps of:
    removing said tee plug from said aperture in said tee without allowing said bore to fluidly communicate with said atmosphere;

removing said tee from said service line without allowing said bore to fluidly communicate with said atmosphere;

inserting an unactivated sealing plug into said service line, said sealing plug being integrally connected to a relining member, said sealing plug and said relining member being inserted into said service line without allowing said bore to fluidly communicate with said atmosphere;

activating said sealing plug;

unsealing said activated sealing plug;

installing a replacement tee onto said service line; and replacing said tee plug, wherein said main and said service are filled with a fluid and said process occurs with the release of substantially none of said fluid.

18. The process of claim 7 further comprising augering said service line to remove loose debris therefrom after removing said tee from said service line.

19. The process of either of claims 17, or 18 further comprising deburring beads within said service line before said unactivated sealing plug is inserted into said service line.

20. The process of claim 19, wherein said service line is deburred using a deburrer with a universal joint.

21. The process of claim 18, further comprising deburring a bonding site within said service line after deburring said beads, wherein said sealing plug is thermally activated at said bonding site.

22. The process of claim 21, further comprising sweeping said service line of deburred debris before inserting said sealing plug into said service line.

23. The process of claims 22, wherein said service line is swept using a nylon brush.

24. The process of claim 21, wherein said bonding site is reamed after it is deburred.

25. The process of claim 24, wherein said bonding site is brushed to remove rust oxides therefrom after sweeping said service line.

26. The process of claim 25, wherein said bonding site is brushed using a metal brush.

27. The process of claim 26, wherein said bonding site is brushed using a metal brush with a redetermined twist, said brush being rotated in an opposite direction thereto.

28. A process for bypassing a gas meter which is fluidly connected via a valve to a first tee surrounded by an atmosphere, said first tee defining a tee plug hole having a tee plug, said gas meter also being fluidly connected to a second tee defining a tee plug hole having a tee plug, said second tee also being surrounded by said atmosphere, said process comprising the steps of:

removing one of said first and second tee plugs respectively from said first or second tee without allowing said first or second tee plug hole to fluidly communicate with said atmosphere;

removing the other of said first and second tee plug from the other of said first or second tee without allowing said other tee plug hole to fluidly communicate with said atmosphere;

installing a valve fluid connection from said first tee plug hole said second tee plug hole;

bleeding air contained in said valved fluid connection from said first tee plug hole to said second tee plug hole;

opening said valved fluid connection so that said first tee plug hole and said second tee plug hole are in fluid communication by said valved fluid connection; and disconnecting said fluid connection from said first tee to said gas meter and from said gas meter to said second tee.

29. The process of claim 28, further comprising the steps of:

repairing or replacing said gas meter;

bleeding air contained in said gas meter;

reestablishing fluid communication from said first tee to said second tee via said gas meter; and interrupting said fluid communication of said valved fluid connection from said first tee plug hole to said second tee plug hole.

30. A process for relining a service line which fluidly connects a main at one end and a tee at another end, said tee having a tee plug, said process being accomplished solely from the tee end of the service line and comprising the steps of:

removing said tee plug from said tee;

removing said tee from said service line;

augering said service line to remove loose debris therefrom;

inserting an unactivated sealing plug into said service line, said sealing plug being integrally connected to a relining member;

activating said sealing plug;

unsealing said activated sealing plug;

installing a replacement tee onto said service line; and replacing said tee plug, wherein said main and said service are filled with a fluid and said process occurs with the release of substantially none of said fluid.

* * * * *